United States Patent
Sumida et al.

(10) Patent No.: US 9,279,475 B2
(45) Date of Patent: Mar. 8, 2016

(54) ELEMENT FOR METALLIC BELT

(75) Inventors: Soichiro Sumida, Saitama (JP); Toru Yagasaki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/399,255

(22) PCT Filed: Jul. 6, 2012

(86) PCT No.: PCT/JP2012/067349
§ 371 (c)(1),
(2), (4) Date: Nov. 6, 2014

(87) PCT Pub. No.: WO2014/006744
PCT Pub. Date: Jan. 9, 2014

(65) Prior Publication Data
US 2015/0105194 A1    Apr. 16, 2015

(51) Int. Cl.
*F16H 55/56* (2006.01)
*F16G 1/21* (2006.01)
*F16G 1/22* (2006.01)
(Continued)

(52) U.S. Cl.
CPC ... *F16G 5/16* (2013.01); *F16H 9/18* (2013.01)

(58) Field of Classification Search
CPC .............. F16G 5/16; F16G 5/18; F16H 9/125; F16H 9/24; F16H 55/56
USPC ............. 474/8, 201, 206, 240, 242, 244, 245, 474/272
See application file for complete search history.

(56) References Cited

U.S. PATENT DOCUMENTS

| | | | | |
|---|---|---|---|---|
| 2,690,678 A | * | 10/1954 | Bendall | F16G 5/18 474/245 |
| 3,016,755 A | * | 1/1962 | Dittrich | F16G 5/18 474/201 |
| 3,364,767 A | * | 1/1968 | Bredschneider | F16G 5/18 474/242 |

(Continued)

FOREIGN PATENT DOCUMENTS

| | | |
|---|---|---|
| JP | 03-055943 U | 5/1991 |
| JP | 06-307510 A | 11/1994 |

(Continued)

OTHER PUBLICATIONS

International Search Report dated Sep. 11, 2012 corresponding to International Patent Application No. PCT/JP2012/067349 and English translation thereof.

(Continued)

*Primary Examiner* — Henry Liu
(74) *Attorney, Agent, or Firm* — Squire Patton Boggs (US) LLP (57) ABSTRACT

An element for a metallic belt in a continuously variable transmission capable of reducing misalignment while ensuring friction force in a small diameter state is provided. An element 40 for a metallic belt in a belt-type continuously variable transmission has a structure in which a side edge of the element 40 of a metallic belt 7 that contacts a drive pulley 5 and a driven pulley 8 includes: a belt radial outer portion 46b that is located on a radial outer side of the metallic belt 7 and linearly shaped to follow a radial inner portion 11a as a constant-angle inclined generatrix portion; and a belt radial inner portion 46a that is located on a radial inner side of the metallic belt 7 and curved to taper inward in the belt radial direction to gradually increase an inclination angle.

6 Claims, 6 Drawing Sheets

(51) Int. Cl.
*F16G 5/16* (2006.01)
*F16H 9/18* (2006.01)

(56) References Cited

U.S. PATENT DOCUMENTS

| | | | | |
|---|---|---|---|---|
| 3,407,672 A * | 10/1968 | Keller | ............... | F16G 5/18 474/242 |
| 3,916,709 A * | 11/1975 | Steuer | ............... | F16H 9/24 474/201 |
| 3,949,621 A * | 4/1976 | Beusink | ............... | F16G 5/16 29/235 |
| 4,344,761 A * | 8/1982 | Steuer | ............... | F16G 5/18 474/167 |
| 4,371,361 A * | 2/1983 | Giacosa | ............... | F16G 5/16 474/201 |
| 4,457,742 A * | 7/1984 | Hattori | ............... | F16G 5/16 474/201 |
| 4,526,561 A * | 7/1985 | Hattori | ............... | F16H 9/24 474/201 |
| 4,553,953 A * | 11/1985 | Bock | ............... | F16G 5/18 474/201 |
| 4,560,370 A * | 12/1985 | Hattori | ............... | F16G 5/16 474/201 |
| 4,622,025 A * | 11/1986 | Kern | ............... | F16G 5/18 474/242 |
| 4,631,042 A * | 12/1986 | Rattunde | ............... | F16H 9/24 474/242 |
| 4,655,732 A * | 4/1987 | Takashima | ............... | F16G 5/166 474/201 |
| 4,655,735 A * | 4/1987 | Sakakibara | ............... | F16G 5/18 474/214 |
| 4,698,050 A * | 10/1987 | Hattori | ............... | F16G 5/16 474/201 |
| 4,708,701 A * | 11/1987 | Cole, Jr. | ............... | F16G 5/18 474/245 |
| 4,738,654 A * | 4/1988 | Cole, Jr. | ............... | F16H 9/24 474/219 |
| 4,795,406 A * | 1/1989 | Dittrich | ............... | F16G 5/18 474/201 |
| 4,813,920 A * | 3/1989 | Inukai | ............... | F16G 5/16 474/240 |
| 4,826,473 A * | 5/1989 | Miyawaki | ............... | F16G 5/16 474/240 |
| 4,854,926 A * | 8/1989 | Hattori | ............... | F16G 5/16 474/201 |
| 4,871,344 A * | 10/1989 | Morisawa | ............... | F16G 5/18 474/206 |
| 4,894,048 A * | 1/1990 | Inukai | ............... | F16G 5/16 474/201 |
| 4,894,049 A * | 1/1990 | Koppelaars | ............... | F16G 5/16 474/240 |
| 4,898,568 A * | 2/1990 | Sakakibara | ............... | F16G 5/18 474/245 |
| 4,909,778 A * | 3/1990 | Schonnenbeck | ............... | F16H 9/24 474/245 |
| 4,927,404 A * | 5/1990 | Rattunde | ............... | F16H 9/24 474/242 |
| 4,938,737 A * | 7/1990 | Yamamuro | ............... | F16G 5/18 474/242 |
| 4,979,930 A * | 12/1990 | Sakakibara | ............... | F16G 5/18 474/242 |
| 5,004,450 A * | 4/1991 | Ide | ............... | F16G 5/16 474/242 |
| 5,019,020 A * | 5/1991 | van Lith | ............... | F16H 9/24 474/240 |
| 5,052,985 A * | 10/1991 | Masuda | ............... | F16G 5/18 474/245 |
| 5,123,880 A * | 6/1992 | Sekine | ............... | F16H 9/24 474/244 |
| 5,169,369 A * | 12/1992 | Masuda | ............... | F16G 5/16 474/242 |
| 5,215,505 A * | 6/1993 | Sugimoto | ............... | F16G 5/18 474/242 |
| 5,306,214 A * | 4/1994 | Masuda | ............... | F16G 5/18 403/134 |
| 5,328,412 A * | 7/1994 | Durum | ............... | F16H 55/56 474/242 |
| 5,346,440 A * | 9/1994 | Smeets | ............... | F16G 5/16 474/242 |
| 5,792,013 A * | 8/1998 | Heinrich | ............... | F16H 9/24 474/242 |
| 6,045,474 A * | 4/2000 | Smeets | ............... | F16G 5/16 188/201 |
| 6,086,499 A * | 7/2000 | Brandsma | ............... | F16G 5/16 474/201 |
| 6,110,065 A * | 8/2000 | Yagasaki | ............... | F16G 5/16 474/244 |
| 6,142,903 A * | 11/2000 | Heinrich | ............... | F16G 5/18 474/215 |
| 6,206,796 B1 * | 3/2001 | Lee | ............... | F16G 5/00 474/8 |
| 6,293,887 B1 * | 9/2001 | Linnenbrugger | ....... | F16H 9/125 474/18 |
| 6,332,854 B1 * | 12/2001 | Kanokogi | ............... | F16G 5/16 474/201 |
| 6,342,020 B1 * | 1/2002 | Aoyama | ............... | F16G 5/16 474/201 |
| 6,406,395 B1 * | 6/2002 | Wakui | ............... | F16G 5/16 474/242 |
| 6,416,433 B1 * | 7/2002 | Linnenbrugger | ....... | F16H 9/125 474/242 |
| 6,440,024 B1 * | 8/2002 | Kobayashi | ............... | F16G 5/163 474/242 |
| 6,599,211 B2 * | 7/2003 | Sattler | ............... | F16G 5/166 474/201 |
| 6,652,403 B2 * | 11/2003 | Drees | ............... | F16H 9/125 474/201 |
| 6,672,984 B2 * | 1/2004 | Yagasaki | ............... | F16G 5/16 474/201 |
| 6,679,798 B1 * | 1/2004 | Takagi | ............... | F16G 5/16 474/201 |
| 6,893,370 B2 * | 5/2005 | Kobayashi | ............... | F16G 5/163 474/242 |
| 6,926,631 B2 * | 8/2005 | Brandsma | ............... | F16G 5/16 474/17 |
| 7,037,225 B2 * | 5/2006 | Takagi | ............... | F16H 55/563 474/8 |
| 7,066,858 B2 * | 6/2006 | Smeets | ............... | F16G 5/163 474/201 |
| 7,097,581 B2 * | 8/2006 | Inukai | ............... | F16G 5/166 474/242 |
| 7,108,624 B2 * | 9/2006 | Smeets | ............... | F16G 5/16 474/201 |
| 7,163,476 B2 * | 1/2007 | Yoshida | ............... | F16G 5/16 474/201 |
| 7,261,656 B2 * | 8/2007 | Sakai | ............... | F16G 5/163 474/201 |
| 7,431,674 B2 * | 10/2008 | Van Der Leest | ........ | F16H 9/125 474/148 |
| 7,766,776 B2 * | 8/2010 | Oishi | ............... | F16G 5/16 474/240 |
| 7,806,793 B2 * | 10/2010 | Yoshida | ............... | F16G 5/16 474/188 |
| 7,963,873 B2 * | 6/2011 | Kobayashi | ............... | F16G 5/16 474/201 |
| 8,100,789 B2 * | 1/2012 | Morgan, Jr. | ............. | F16H 55/56 474/69 |
| 8,272,984 B2 * | 9/2012 | Kato | ............... | F16G 5/16 474/242 |
| 8,491,426 B2 * | 7/2013 | Van Der Leest | ........ | F16H 9/125 474/12 |
| 8,795,110 B2 * | 8/2014 | Endler | ............... | F16H 9/125 474/8 |
| 8,814,735 B2 * | 8/2014 | Toyohara | ............... | F16G 5/16 474/242 |
| 8,863,368 B2 * | 10/2014 | Yasuhara | ............... | B21L 15/00 29/446 |
| 9,103,412 B2 * | 8/2015 | Yagasaki | ............... | F16H 9/125 |
| 2001/0016974 A1* | 8/2001 | Someno | ............... | B21D 53/14 29/557 |
| 2002/0025872 A1* | 2/2002 | Shiba | ............... | F16G 5/16 474/242 |
| 2002/0025873 A1* | 2/2002 | Akagi | ............... | F16G 5/16 474/242 |

(56) References Cited

U.S. PATENT DOCUMENTS

| | | | | |
|---|---|---|---|---|
| 2002/0077211 | A1* | 6/2002 | Drees | F16H 9/125 475/210 |
| 2002/0151399 | A1* | 10/2002 | Mott | F16G 5/16 474/242 |
| 2002/0183152 | A1* | 12/2002 | Kobayashi | F16G 5/163 474/242 |
| 2003/0144097 | A1* | 7/2003 | Brandsma | F16G 5/16 474/8 |
| 2003/0162616 | A1* | 8/2003 | Miura | F16G 5/16 474/242 |
| 2004/0033855 | A1* | 2/2004 | Inukai | F16G 5/166 474/242 |
| 2004/0072644 | A1* | 4/2004 | van Lith | F16G 5/163 474/242 |
| 2004/0162173 | A1* | 8/2004 | Yoshida | F16G 5/16 474/242 |
| 2004/0176202 | A1* | 9/2004 | Sakai | F16G 5/163 474/242 |
| 2005/0221938 | A1* | 10/2005 | Yoshida | F16G 5/16 474/242 |
| 2006/0030443 | A1* | 2/2006 | Oishi | F16G 5/166 474/237 |
| 2006/0058125 | A1* | 3/2006 | Van Der Leest | F16H 9/125 474/8 |
| 2007/0072721 | A1* | 3/2007 | Takagi et al. | F16G 5/16 474/242 |
| 2007/0117663 | A1* | 5/2007 | Van Der Leest | F16H 9/125 474/8 |
| 2008/0051235 | A1* | 2/2008 | Tada | F16G 5/18 474/8 |
| 2008/0274848 | A1* | 11/2008 | Van Der Leest | F16G 5/16 474/201 |
| 2009/0029817 | A1* | 1/2009 | Kamamoto | F16G 5/18 474/248 |
| 2009/0069137 | A1* | 3/2009 | Van Rooif | F16G 5/18 474/229 |
| 2009/0082148 | A1* | 3/2009 | Van Der Leest | F16H 55/56 474/166 |
| 2009/0280940 | A1* | 11/2009 | Toyohara | F16G 5/16 474/242 |
| 2010/0069189 | A1* | 3/2010 | Tada | F16G 5/18 474/245 |
| 2010/0071191 | A1* | 3/2010 | Yasuhara | B21L 15/00 29/446 |
| 2010/0144474 | A1* | 6/2010 | Lee | F16G 5/16 474/240 |
| 2010/0144475 | A1* | 6/2010 | Brandsma | F16G 5/166 474/264 |
| 2010/0227721 | A1* | 9/2010 | Kato | F16G 5/16 474/242 |
| 2010/0243131 | A1* | 9/2010 | Kobayashi | F16G 5/16 156/137 |
| 2011/0098144 | A1* | 4/2011 | Van Der Leest | F16H 9/125 474/8 |
| 2011/0300980 | A1* | 12/2011 | Kuwabara | F16G 5/16 474/242 |
| 2012/0021859 | A1* | 1/2012 | Faes | F16G 5/16 474/240 |
| 2012/0190490 | A1* | 7/2012 | Morino | F16G 5/16 474/240 |
| 2012/0208663 | A1* | 8/2012 | Yamanaka | F16G 5/16 474/240 |
| 2013/0081500 | A1* | 4/2013 | Helin | A01D 34/6806 74/473.3 |
| 2014/0066243 | A1* | 3/2014 | Nakazawa | F16G 5/18 474/242 |
| 2014/0235381 | A1* | 8/2014 | Yagasaki | F16H 9/125 474/8 |
| 2014/0329627 | A1* | 11/2014 | Helin | A01D 34/6806 474/8 |
| 2014/0371015 | A1* | 12/2014 | Van Der Sluis | F16G 5/16 474/240 |

FOREIGN PATENT DOCUMENTS

| | | |
|---|---|---|
| JP | 2002-031215 A | 1/2002 |
| JP | 2004-225810 A | 8/2004 |
| JP | 2008-523335 A | 7/2008 |
| JP | 2011-106667 A | 6/2011 |
| WO | WO 2006/062400 A1 | 6/2006 |

OTHER PUBLICATIONS

Japanese Office Action application No. 2014-523518 dated Jun. 23, 2015.

* cited by examiner

LOW RATIO

FIG.5B

OD RATIO

FIG.6

PRIOR ART

ELEMENT FOR METALLIC BELT

TECHNICAL FIELD

The present invention relates to an element for a metallic belt wound around a drive pulley and a driven pulley in a continuously variable transmission.

BACKGROUND ART

A belt-type continuously variable transmission including a drive pulley, a driven pulley, and a metallic belt wound around the two pulleys is conventionally known (for example, see Patent Literature 1).

Figure 6:
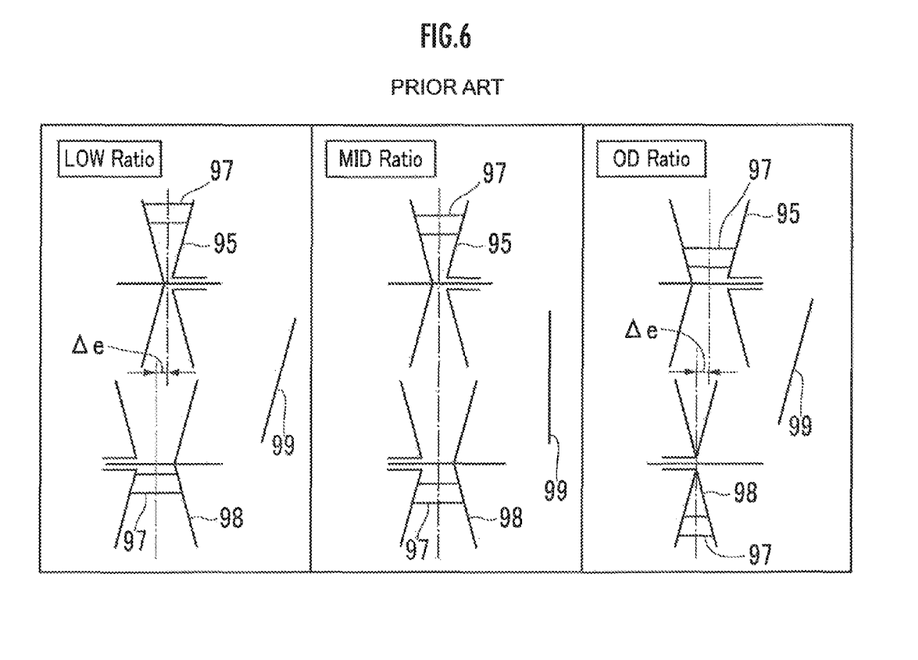
FIG. 6 is an explanatory diagram showing misalignment of a conventional continuously variable transmission.

FIG. 6 shows a deviation Δe in longitudinal center line of a metallic belt 97 in a cross section including the center axes of a drive pulley 98 and a driven pulley 95, in the case where the contact surfaces (hereafter referred to as "V surfaces") between the respective drive pulley 98 and driven pulley 95 and the metallic belt 97 in the cross section are linearly shaped. As shown in FIG. 6, when the gear ratio is changed from maximum (LOW ratio) through intermediate (MID ratio) to minimum (overdrive (OD) ratio), the metallic belt 97 moves in the direction of the center axes of the drive pulley 98 and driven pulley 95 according to changes in width of the pulley grooves of the two pulleys 98 and 95. Here, since the amount of movement of the metallic belt 97 differs between the drive pulley 98 side and the driven pulley 95 side, the deviation Δe in longitudinal center line of the metallic belt 97 changes in the right-left direction, and the orientation 99 of the metallic belt 97 fluctuates right and left (this deviation in longitudinal center line of the metallic belt 97 is hereafter referred to as "misalignment").

If the metallic belt is misaligned in this way, uneven wear occurs in the contact surfaces (V surfaces) between the respective drive and driven pulleys and the metallic belt, or the metallic belt is twisted and as a result decreases in durability.

In Patent Literature 1, misalignment is prevented in the following manner. The inclination angle (the angle with respect to a plane perpendicular to the center axis of the pulley) of the generatrix on the outer diameter side of the pulley is set larger than the inclination angle of the generatrix on the inner diameter side of the pulley to widen the pulley groove, while the boundary portion between the outer diameter side and inner diameter side of the pulley is shaped as a smooth convex curved surface. The side edge of the body portion of each element of the metallic belt is formed in correspondence with the pulley in such a manner that the angle on the outer diameter side of the metallic belt is set to make line contact with the inner diameter side of the pulley and the angle on the inner diameter side of the metallic belt is set to make line contact with the outer diameter side of the pulley.

A continuously variable transmission in which the generatrix from the inner diameter side to outer diameter side of the pulley is a smooth curve to prevent misalignment is also known (for example, see Patent Literature 2).

CITATION LIST

Patent Literature

Patent Literature 1: Japanese Patent Application Laid-Open No. H6-307510

Patent Literature 2: Japanese Patent Application Laid-Open No. 2002-31215

SUMMARY OF INVENTION

Technical Problem

In Patent Literature 1, the boundary portion is a smooth convex curved surface, but the amount of change of the angle of the generatrix in the boundary portion is large. This causes a problem in that gear change control when the element contacts the boundary portion is difficult.

In Patent Literature 2, the part of contact between the pulley and the element is point contact. This causes a problem in that the friction coefficient between the element and the pulley decreases in a small diameter state where the element contacts the inner diameter side of the pulley.

In view of the above, the present invention has an object of providing an element for a metallic belt in a continuously variable transmission capable of reducing misalignment while ensuring friction force between an element and a pulley in a small diameter state.

Solution to Problem

[1] To achieve the object stated above, the present invention is an element for a metallic belt used in a belt-type continuously variable transmission, the belt-type continuously variable transmission including: a drive pulley and a driven pulley each of which has a pulley groove defined by a fixed pulley half and a movable pulley half; and a belt including an element and wound around the pulley groove of each of the drive pulley and the driven pulley, a constant-angle inclined generatrix portion in which a generatrix is inclined at a constant angle to widen the pulley groove radially outward being formed on a radial inner side of a surface of contact, with the element, of at least the fixed pulley half out of the fixed pulley half and the movable pulley half, a curved generatrix portion in which the generatrix is curved to gradually increase an inclination angle while widening the pulley groove radially outward being formed on a radial outer side of the surface of contact, the belt-type continuously variable transmission changing a gear ratio by: moving the movable pulley half of one pulley out of the drive pulley and the driven pulley away from the fixed pulley half of the pulley to increase a width of the pulley groove of the pulley; and moving the movable pulley half of the other pulley out of the drive pulley and the driven pulley closer to the fixed pulley half of the other pulley to decrease a width of the pulley groove of the other pulley, and the element being characterized in that a belt radial outer portion of a side edge of the element of the belt that contacts the drive pulley and the driven pulley is linearly shaped to follow the constant-angle inclined generatrix portion, and a belt radial inner portion of the side edge of the element is a curved shape curved to taper inward to gradually increase an inclination angle (an inclination angle with respect to a plane perpendicular to a center axis of the pulley).

According to the present invention, in the case where the belt is wound around the pulley in a small diameter, the constant-angle inclined generatrix portion of the pulley and the linear shaped portion of the side edge of the element contact each other, where the element and the pulley are in line contact with each other. In the case where the belt is wound around the pulley in a large diameter, the curved generatrix portion of the pulley and the curved shaped portion of the side edge of the element contact each other, where the element and the pulley are in point contact with each other.

The present invention can thus prevent a decrease in friction coefficient in the case where the belt is wound around the pulley in a small diameter, and a decrease in durability of the belt and the pulley due to high surface pressure.

[2] Moreover, in the present invention, it is preferable that the curved belt radial inner portion of the side edge of the element is smoothly curved from the inclination angle of the linearly shaped belt radial outer portion of the side edge of the element to an angle greater than or equal to a tangent angle of an outermost diameter in a contact range in which the pulley and the element contact each other, in an inward direction.

The side edge of a conventional element is linear. Such a conventional element has a problem of low durability because, when the generatrix of the pulley is curved, the lower end of the side edge of the element and the pulley come into point contact with each other and the lower end of the side edge of the element wears out easily.

According to the present invention, the part of contact between the element and the pulley moves with gear ratio change. This prevents the same part of the element from being in contact with the pulley for a relatively long time during gear change, thus improving the durability of the element.

[3, 5] In the case where the belt wound around the pulley is in a small diameter, the radial outer portion of the side edge of the element and the radial inner portion of the pulley come into line contact with each other. Here, a failure to properly discharge lubricating oil present between the element and the pulley causes a fluid lubrication state and puts the belt in danger of slip.

If an oil drain groove extending in a plate thickness direction of the element is formed in the linearly shaped belt radial outer portion of the side edge of the element, the lubricating oil between the element and the pulley is properly discharged (released) from the oil drain groove, so that the belt can be kept from slipping.

[4, 6] Moreover, in the present invention, it is preferable that the oil drain groove is formed in the linearly shaped portion of the element except a boundary portion between the linearly shaped portion and the curved portion of the element. With such a structure, when the part of contact between the element and the pulley changes between the linear shaped portion of the pulley and the curved portion of the pulley according to gear change, the gear change is performed smoothly.

DESCRIPTION OF EMBODIMENTS

Figure 1:
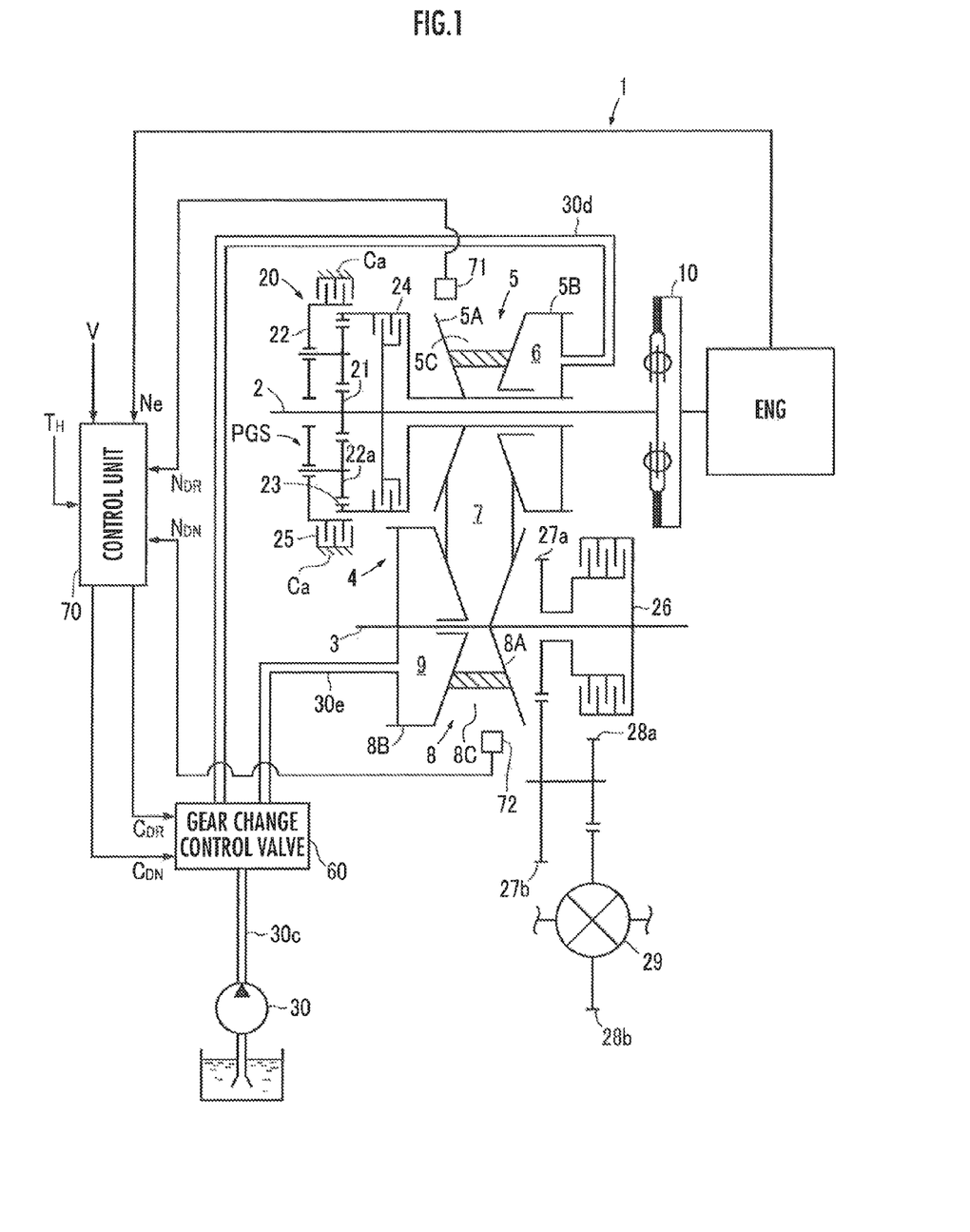
FIG. 1 is an explanatory diagram schematically showing a continuously variable transmission that uses an element according to an embodiment of the present invention.

FIG. 1 shows an overall structure of a belt-type continuously variable transmission 1 that uses an element according to an embodiment of the present invention. The belt-type continuously variable transmission 1 includes: a transmission input shaft 2 connected to an output shaft of an engine ENG as a drive source via a flywheel damper 10; a transmission counter shaft 3 arranged in parallel with the transmission input shaft 2; a metallic belt mechanism 4 placed between the transmission input shaft 2 and the transmission counter shaft 3; and a forward/backward switching mechanism 20 placed on the transmission input shaft 2. The belt-type continuously variable transmission 1 is provided with a hydraulic pump 30 and a gear change control valve 60. The hydraulic pump 30 transmits hydraulic oil to the gear change control valve 60 via an oil passage 30c. The gear change control valve 60 is capable of adjusting/controlling the hydraulic pressure of the transmitted hydraulic oil. The gear change control valve 60 transmits the pressure-adjusted hydraulic oil to the metallic belt mechanism 4 via oil passages 30d and 30e. The gear change of the belt-type continuously variable transmission 1 is controlled in this way.

The metallic belt mechanism 4 includes: a drive pulley 5 provided rotatably on the transmission input shaft 2; a driven pulley 8 provided on the transmission counter shaft 3 so as to rotate together with the transmission counter shaft 3; and a metallic belt 7 wound around the two pulleys 5 and 8.

Figure 2:
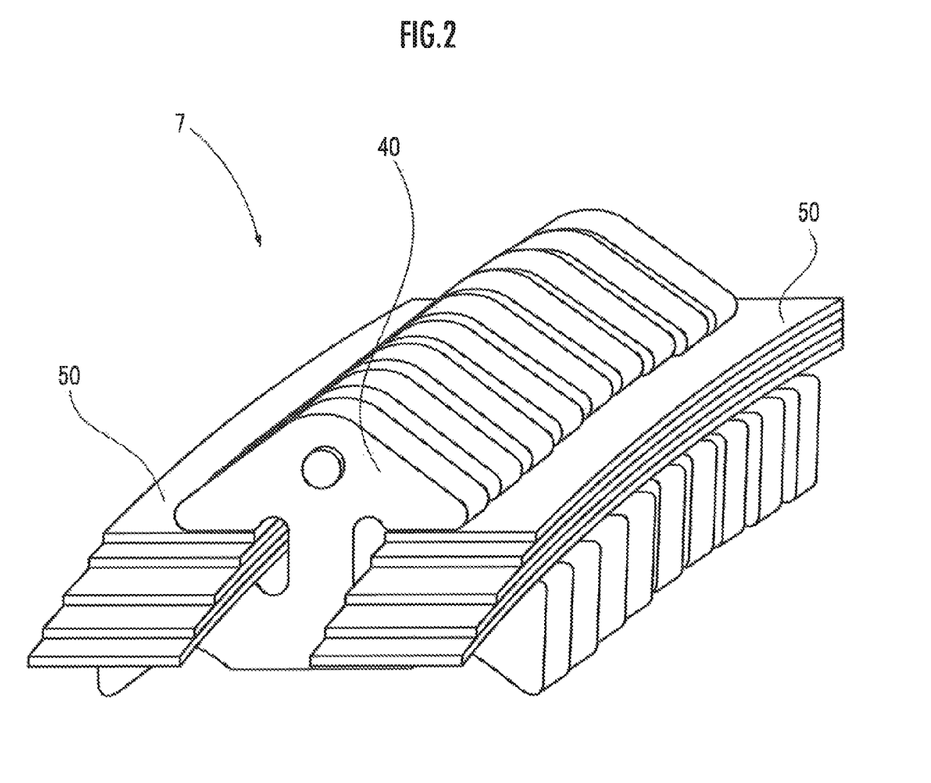
FIG. 2 is an explanatory diagram showing a metallic belt according to the embodiment.
Figure 3:
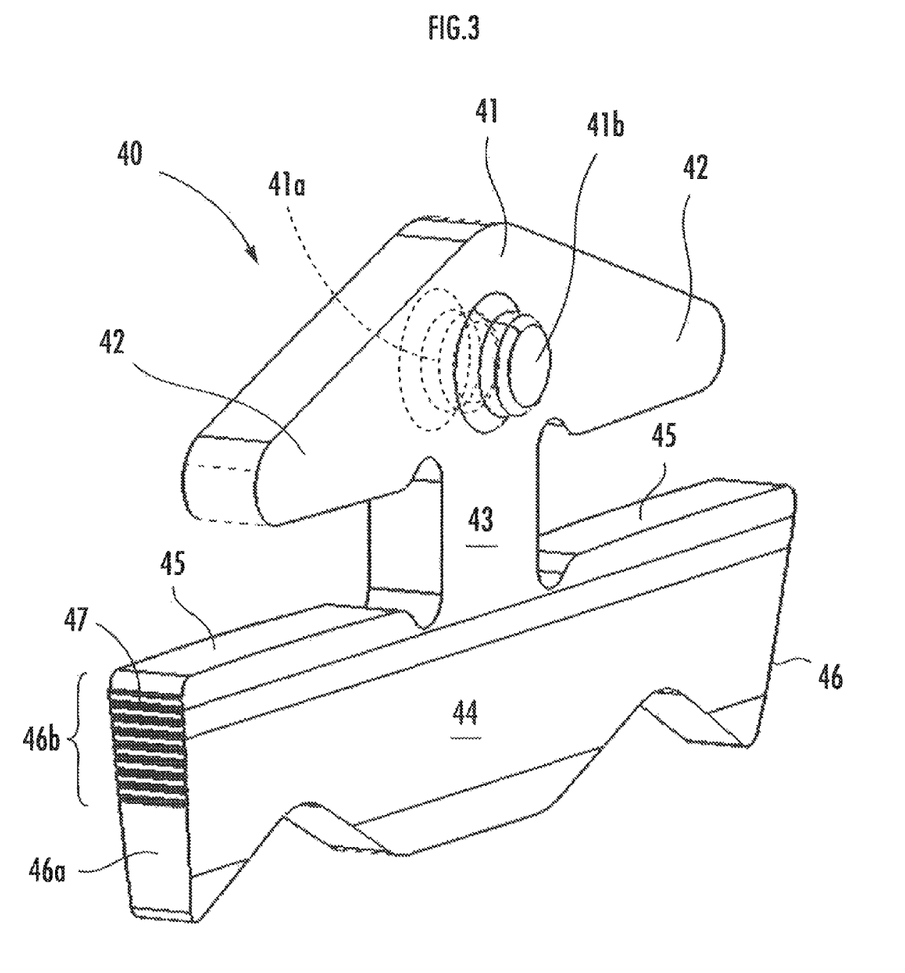
FIG. 3 is an explanatory diagram showing an element according to the embodiment.

The metallic belt 7 includes: many circularly connected elements 40; and two bundles of ring 50 attached to the elements 40 in a stacked state, as shown in FIG. 2. Each element 40 is formed like a flat plate, and includes: a head portion 41 with an ear portion 42 extending right and left; a body portion 44 extending right and left over the ear portion 42; and a neck portion 43 connecting the body portion 44 and the head portion 41, as shown in FIG. 3.

A nose hole 41a is formed on one surface of the head portion 41, and a nose portion 41b that can be inserted into the nose hole 41a of the adjacent element 40 is formed on the other surface of the head portion 41. The adjacent elements 40 are connected to each other by the nose portion 41b of one element 40 being fit into the nose hole 41a of the other element 40.

The ring 50 is formed by radially stacking ring-shaped endless metallic bands. The ring 50 is located in the space defined by the ear portion 42, the neck portion 43, and the body portion 44 on the right and left of the element 40, and sandwiched between the lower edge of the ear portion 42 and the upper edge (a saddle surface 45) of the body portion 44. A V surface 46 shaped like a letter V so as to gradually taper inward in the belt radial direction is formed on both right and left side edges of the body portion 44. The V surfaces 46 contact and are sandwiched between V surfaces 11 of the drive pulley 5 or the driven pulley 8 described later.

The drive pulley 5 includes: a fixed pulley half 5A provided rotatably but axially non-movably on the transmission input shaft 2; and a movable pulley half 5B axially movable relative to the fixed pulley half 5A. A drive-side cylinder chamber 6 is formed on the side of the movable pulley half 5B, and an axial thrust (drive pulley axial thrust) for axially moving the movable pulley half 5B is generated by the hydraulic pressure supplied from the gear change control valve 60 via the oil passage 30d. A V surface 11 is formed in the part of contact (contact surface) of the fixed pulley half 5A with the metallic belt 7. The V surface 11 is also formed in the movable pulley half 5B so as to face the fixed pulley half 5A. The metallic belt 7 is sandwiched between the V surfaces 11 formed in the fixed pulley half 5A and the movable pulley half 5B.

The driven pulley 8 includes: a fixed pulley half 8A arranged joined onto the transmission counter shaft 3; and a movable pulley half 8B axially movable relative to the fixed pulley half 8A. A driven-side cylinder chamber 9 is formed on the side of the movable pulley half 8B, and an axial thrust (driven pulley axial thrust) for axially moving the movable pulley half 8B is generated by the hydraulic pressure supplied from the gear change control valve 60 via the oil passage 30e. The V surfaces 11 are formed in the driven pulley 8 as in the drive pulley 5, and the metallic belt 7 is sandwiched between the V surfaces 11 in the fixed pulley half 8A and the movable pulley half 8B.

Figure 4:
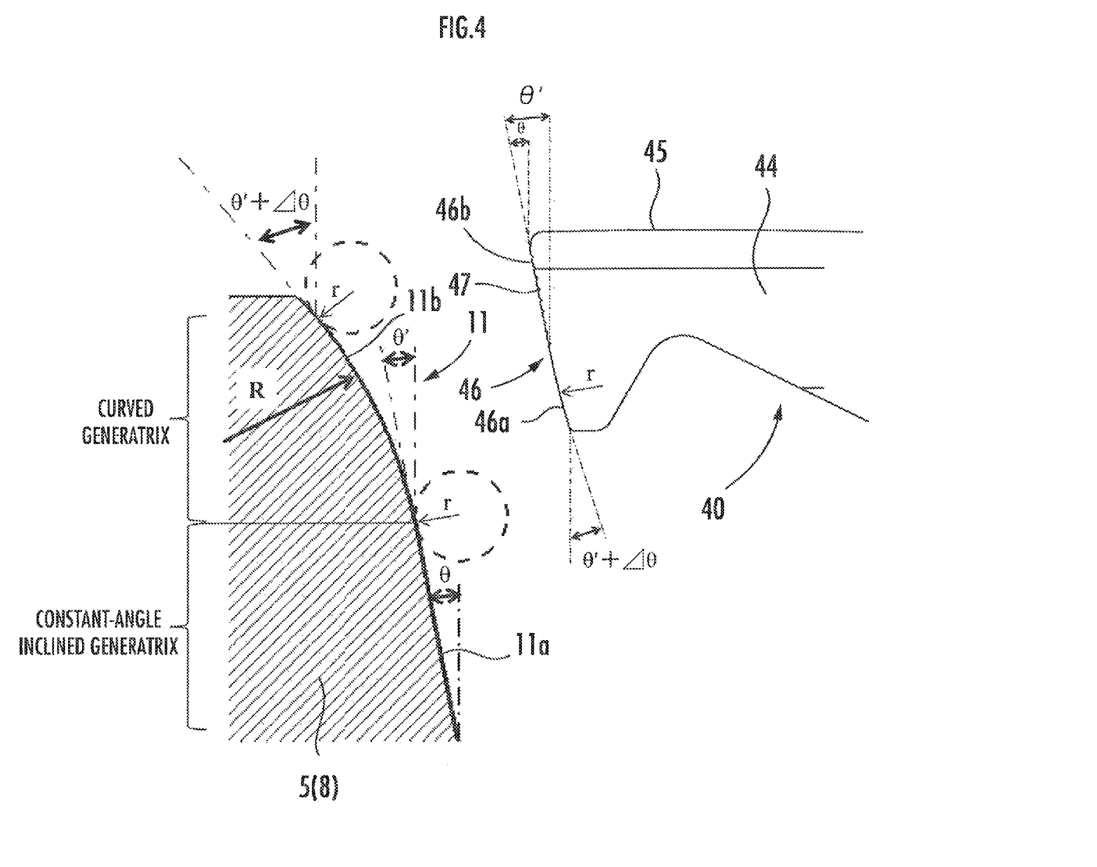
FIG. 4 is an explanatory diagram showing a pulley and an element according to the embodiment.

As shown in FIG. 4, a radial inner portion 11a of the V surface 11 is a constant-angle inclined generatrix portion in which the generatrix is inclined at a constant angle θ (where θ is an angle with respect to a plane perpendicular to the center axis of the pulley) so that a pulley groove 5C or 8C defined between the fixed pulley half 5A or 8A and the movable pulley half 5B or 8B widens radially outward. A radial outer portion 11b of the V surface 11 is a curved generatrix portion in which the generatrix is curved so that the pulley groove 5C or 8C gradually widens radially outward to gradually increase the inclination angle. The inclination angle of the outermost diameter of the V surface 11 as the contact range that contacts the element 40 is θ'+Δθ where θ'=θ.

A belt radial outer portion 46b of the V surface 46 which is the side edge of the element 40 is linearly shaped to follow the radial inner portion 11a of the V surface 11 as a constant-angle inclined surface of the pulley 5 or 8, and is set to have an inclination angle of θ. A plurality of oil drain grooves 47 extending in the plate thickness direction of the element 40 are provided in the belt radial outer portion 46b. A belt radial inner portion 46a of the V surface 46 is a shape which curves so as to come into point contact with the radial outer portion 11b of the V surface 11 as a curved inclined surface of the pulley 5 or 8. No oil drain groove 47 is provided in the boundary portion between the belt radial outer portion 46b and the belt radial inner portion 46a.

The curved shape of the radial inner portion 46a of the side edge of the element 40 is smoothly curved so that the inclination angle gradually changes from the inclination angle θ (θ=θ') of the linearly shaped radial outer portion 46b of the side edge of the element 40 to the tangent angle (θ'+Δθ) of the outermost diameter of the V surface 11 as the contact range in which the pulley 5 or 8 contacts the element 40, inward in the belt radial direction.

The gear change control valve 60 controls the hydraulic pressure (pulley pressure control hydraulic pressure) supplied to the drive-side cylinder chamber 6 and the driven-side cylinder chamber 9, as a result of which a pulley axial thrust (referred to as "slip prevention axial thrust") for preventing the metallic belt 7 from slipping can be set, and the pulley widths of the drive pulley 5 and driven pulley 8 can be set variably. This enables the belt-type continuously variable transmission 1 to continuously change the winding radius of the metallic belt 7 on each of the pulleys 5 and 8 to steplessly (continuously) control the gear ratio.

The forward/backward switching mechanism 20 includes: a planetary gear set PGS; a forward clutch 24; and a backward brake 25. The planetary gear set PGS has a single pinion structure made up of: a sun gear 21 connected to the transmission input shaft 2; a ring gear 23 connected to the fixed pulley half 5A; and a carrier 22 that pivotally supports a pinion 22a which meshes with the sun gear 21 and the ring gear 23 rotatably and revolvably.

The backward brake 25 is capable of fixing the carrier 22 to and holding it in a casing Ca. The forward clutch 24 is capable of connecting the sun gear 21 and the ring gear 23. When the forward clutch 24 is engaged, the sun gear 21, the carrier 22, and the ring gear 23 rotate together with the transmission input shaft 2, and the drive pulley 5 is driven in the same direction (forward direction) as the transmission input shaft 2. When the backward brake 25 is engaged, on the other hand, the carrier 22 is fixed to and held in the casing Ca, and the ring gear 23 is driven in the opposite direction (backward direction) to the sun gear 21.

The planetary gear set PGS may have a double pinion structure. In such a case, the fixed pulley half 5A is connected to the carrier, and the ring gear is provided with the backward brake.

Power from the engine ENG is transmitted to the transmission counter shaft 3 through gear change via the metallic belt mechanism 4 and the forward/backward switching mechanism 20. The power transmitted to the transmission counter shaft 3 is transmitted to a differential mechanism 29 via a start clutch 26 and gears 27a, 27b, 28a, and 28b, and then transmitted from the differential mechanism 29 separately to right and left wheels (not shown).

The gear change control valve 60 controls the hydraulic pressure supply to the drive-side cylinder chamber 6 and the driven-side cylinder chamber 9 to perform gear change control, as mentioned earlier. Here, the operation of the gear change control valve 60 is controlled by gear change control signals $C_{DR}$ and $C_{DN}$ from a gear change control unit 70.

The gear change control valve 60 has two solenoid valves for controlling the respective hydraulic pressures supplied to the drive-side cylinder chamber 6 and the driven-side cylinder chamber 9. These solenoid valves are operated according to the gear change control signals $C_{DR}$ and $C_{DN}$ output from the gear change control unit 70, for gear change control. The hydraulic pressures in the cylinder chambers 6 and 9 are set respectively based on the gear change control signals $C_{DR}$ and $C_{DN}$, thus setting the drive pulley axial thrust applied to the drive pulley 5 and the driven pulley axial thrust applied to the driven pulley 8.

For such gear change control, an engine rotation signal Ne, an engine throttle opening degree signal $T_H$, a vehicle velocity signal V, a drive pulley rotation signal $N_{SR}$ obtained by a drive rotation speed detector 71, and a driven pulley rotation signal $N_{DN}$ obtained by a driven rotation speed detector 72 are detected and input to the gear change control unit 70.

The generatrix in the radial inner portion 11a of the V surface 11 of the pulley 5 or 8 is linearly shaped to form a constant-angle inclined surface, and the radial outer portion 46b of the V surface 46 of the element 40 is linearly shaped to follow the constant-angle inclined surface of the radial inner portion 11a of the pulley 5 or 8. This ensures a sufficient friction coefficient μ between the pulley 5 or 8 and the metallic belt 7, and prevents the metallic belt 7 from slipping from the pulley 5 or 8. The reason is described below.

The friction coefficient μ between the V surface 11 of the pulley 5 or 8 and the V surface 46 of the element 40 is not constant. The friction coefficient μ increases when the V surface 11 and the V surface 46 are in line contact with each other, and decreases when the V surface 11 and the V surface 46 are in point contact with each other.

This is because the pulley 5 or 8 and the metallic belt 7 are not in direct contact with each other but a reaction film (boundary film) made of an additive in lubricating oil is present in the part of contact between the pulley 5 or 8 and the metallic belt 7. When the V surface 11 and the V surface 46 are in point contact with each other, the area of the part of contact is smaller than when the V surface 11 and the V surface 46 are in line contact with each other, so that the shear strength of the oil film between the V surface 11 and the V surface 46 decreases and the friction coefficient μ decreases. When the V surface 11 and the V surface 46 are in line contact with each other, the area of the part of contact is larger than when the V surface 11 and the V surface 46 are in point contact with each other, so that the shear strength of the oil film between the V surface 11 and the V surface 46 increases and the friction coefficient μ increases.

Thus, of the radial inner portion 11a and radial outer portion 11b of the V surface 11, the radial inner portion 11a in which the generatrix is linearly shaped is in line contact with the radial outer portion 46b of the V surface 46 to increase the friction coefficient μ, and the radial outer portion 11b in which the generatrix is curved, is in point contact with the radial inner portion 46a of the V surface 46 to decrease the friction coefficient μ.

Figure 5A:
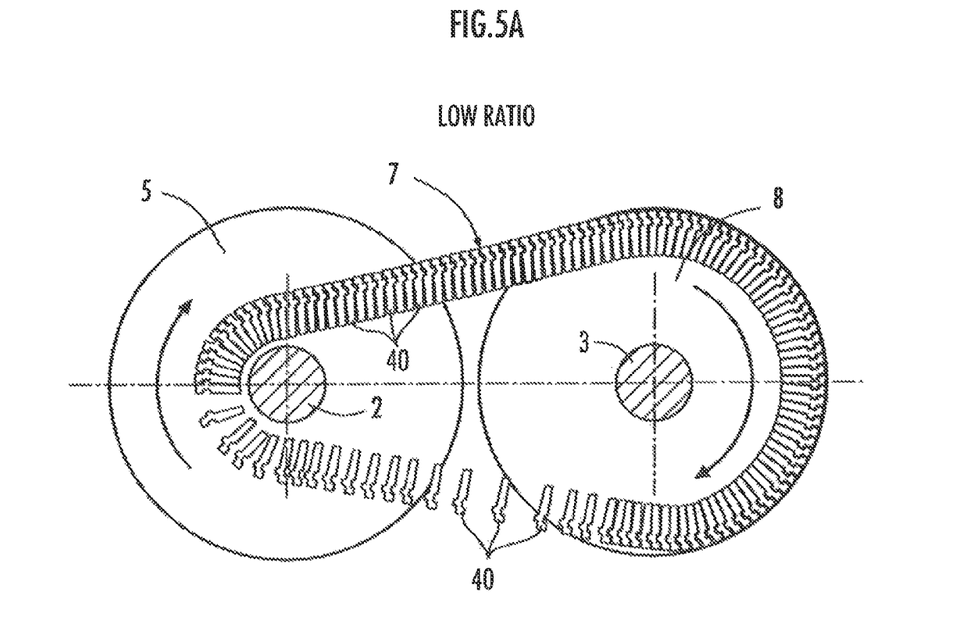
FIG. 5A and FIG. 5B are explanatory diagrams showing the state of the metallic belt wound around pulleys according to the embodiment.

FIG. 5A shows the state of the metallic belt 7 when a gear ratio i is LOW. The winding radius of the metallic belt 7 is small on the drive pulley 5 side and large on the driven pulley 8 side. Accordingly, the number of elements 40 engaging with the drive pulley 5 is smaller than the number of elements 40 engaging with the driven pulley 8.

Transmission torque is given by the product of the friction force of each individual element 40, the number of elements 40 engaging with the pulley 5 or 8, and the distance between the axis to the winding position. On the drive pulley 5 side, the number of elements 40 engaging with the drive pulley 5 and the distance from the axis to the winding position are both small, which increases the friction force of each individual element 40. On the driven pulley 8 side, on the other hand, the number of elements 40 engaging with the driven pulley 8 and the distance from the axis to the winding position are both large, which decreases the friction force of each individual element 40.

Hence, whether or not a slip occurs between the pulley 5 or 8 and the metallic belt 7 depends on whether or not a sufficient friction coefficient μ between the radial inner portion 11a of the drive pulley 5 and the element 40 is ensured, while the friction coefficient μ between the radial outer portion 11b of the driven pulley 8 and the element 40 has little effect.

In this embodiment, the generatrix of the radial inner portion 11a of the drive pulley 5 is linearly shaped, and the radial outer portion 46b of the V surface 46 comes into line contact with the radial inner portion 11a of the drive pulley 5 to increase the friction coefficient μ. This reliably prevents the metallic belt 7 from slipping. Moreover, even when the generatrix of the radial outer portion 11b of the drive pulley 5 and the radial inner portion 46a of the element 40 are curved to compensate for misalignment, the metallic belt 7 is kept from slipping because the friction force of each individual element 40 is small on the large diameter side.

Figure 5B:
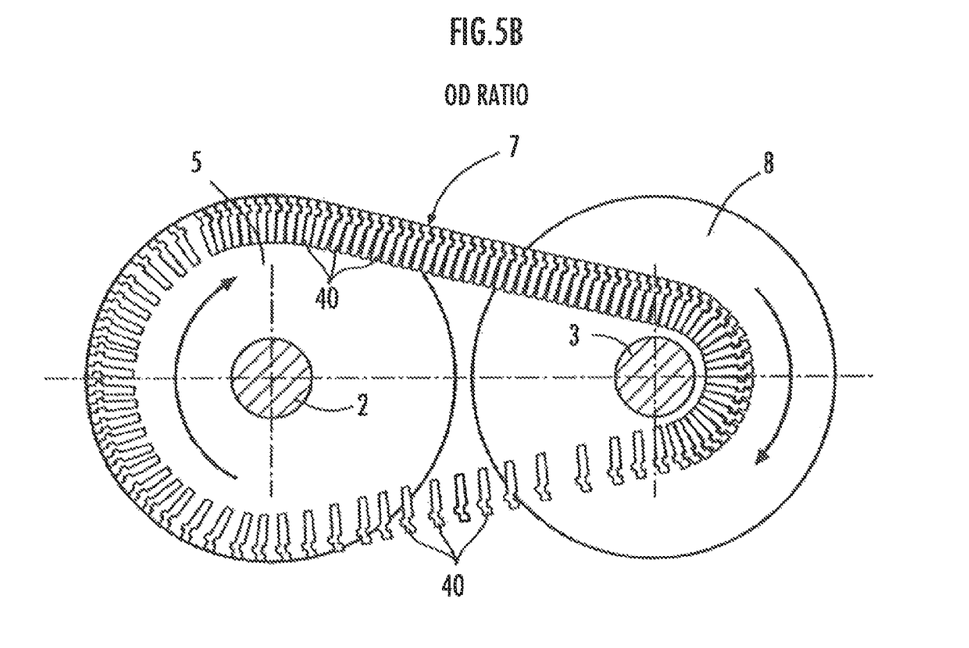

FIG. 5B shows the state of the metallic belt 7 when the gear ratio i is OD. The winding radius of the metallic belt 7 is small on the driven pulley 8 side and large on the drive pulley 5 side. Accordingly, the number of elements 40 engaging with the driven pulley 8 on the small diameter side is smaller than the number of elements 40 engaging with the drive pulley 5 on the large diameter side.

Transmission torque is given by the product of the friction force of each individual element 40, the number of elements 40 engaging with the pulley 5 or 8, and the distance between the axis to the winding position. On the driven pulley 8 side, the number of elements 40 engaging with the driven pulley 8 and the distance from the axis to the winding position are both small, which increases the friction force of each individual element 40. On the drive pulley 5 side, on the other hand, the number of elements 40 engaging with the drive pulley 5 and the distance from the axis to the winding position are both large, which decreases the friction force of each individual element 40.

Hence, whether or not a slip occurs between the pulley 5 or 8 and the metallic belt 7 depends on whether or not a sufficient friction coefficient μ between the radial inner portion 11a of the driven pulley 8 on the small diameter side and the element 40 is ensured, and the friction coefficient μ between the radial outer portion 11b of the drive pulley 5 and the element 40 has little effect.

In this embodiment, the generatrix of the radial inner portion 11a of the driven pulley 8 is linearly shaped, and the radial outer portion 46b of the V surface 46 comes into line contact with the radial inner portion 11a of the driven pulley 8 to increase the friction coefficient μ. This reliably prevents the metallic belt 7 from slipping. Moreover, even when the generatrix of the radial outer portion 11b of the drive pulley 5 and the radial inner portion 46a of the element 40 are curved to compensate for misalignment, the metallic belt 7 is kept from slipping because the friction force of each individual element 40 is small on the large diameter side.

In the continuously variable transmission 1 that uses the element 40 according to this embodiment, in the case where the metallic belt 7 is wound around the pulley 5 or 8 in a small diameter, the radial inner portion 11a as the constant-angle inclined generatrix portion of the pulley 5 or 8 and the belt radial outer portion 46b as the linear portion of the side edge of the element 40 contact each other, where the element 40 and the pulley 5 or 8 are in line contact with each other.

In the case where the metallic belt 7 is wound around the pulley 5 or 8 in a large diameter, the radial outer portion 11b as the curved generatrix portion of the pulley 5 or 8 and the belt radial inner portion 46a as the curved shaped portion of the side edge of the element 40 contact each other, where the element 40 and the pulley 5 or 8 are in point contact with each other.

Therefore, the decrease in friction coefficient in the case where the metallic belt 7 is wound around the pulley 5 or 8 in a small diameter can be prevented by line contact, and the decrease in durability of the pulleys 5 and 8 and the element 40 due to high surface pressure occurring in point contact can be prevented by line contact.

In the case where the metallic belt 7 is wound around the pulley 5 or 8 in a large diameter, the part of contact between the element and the pulley moves as the gear ratio changes. This prevents the same part of the element from being in contact with the pulley for a long time during gear change, thus improving the durability of the element.

In the case where the metallic belt 7 wound around the pulley 5 or 8 is in a small diameter, the side edge of the element 40 and the radial inner portion 11a of the pulley 5 or 8 come into line contact with each other. Here, a failure to properly discharge lubricating oil present between the element 40 and the pulley 5 or 8 causes a fluid lubrication state and puts the metallic belt 7 in danger of slip.

If the oil drain groove 47 extending in the plate thickness direction of the element 40 is formed in the linearly shaped radial outer portion, i.e. the belt radial outer portion 46b, of the side edge of the element 40, the lubricating oil between the element 40 and the pulley 5 or 8 is properly discharged (released) from the oil drain groove 47, so that the metallic belt 7 can be prevented from slipping.

Moreover, in this embodiment, the plurality of oil drain grooves 47 are formed on the side edge of the element 40, in the linearly shaped belt radial outer portion 46b of the element 40 except the boundary portion between the linearly shaped belt radial outer portion 46b and the curved shaped belt radial inner portion 46a of the element 40. With such a structure, the part of contact between the element 40 and the pulley 5 or 8 smoothly changes between the radial inner portion 11a and radial outer portion 11b of the pulley 5 or 8 according to gear change.

DESCRIPTION OF REFERENCE NUMERALS

1: belt-type continuously variable transmission
2: transmission input shaft
3: transmission counter shaft
4: metallic belt mechanism
5: drive pulley
5A: fixed pulley half
5B: movable pulley half
5C: pulley groove
6: drive-side cylinder chamber
7: metallic belt
8: driven pulley
8A: fixed pulley half
8B: movable pulley half
8C: pulley groove
9: driven-side cylinder chamber
10: flywheel damper
11: V surface
11a: radial inner portion (constant-angle inclined generatrix portion)
11b: radial outer portion (curved generatrix portion)
21: sun gear
22: carrier
22a: pinion
23: ring gear
24: forward clutch
25: backward brake
26: start clutch
27a, 27b, 28a, 28b: gear
29: differential mechanism
30: hydraulic pump
30c, 30d, 30e: oil passage
40: element
41: head portion
41a: nose hole
41b: nose portion
42: ear portion
43: neck portion
44: body portion
45: saddle surface
46: V surface
46a: belt radial inner portion (curved shaped)
46b: radial outer portion (linearly shaped)
47: oil drain groove
50: ring
60: gear change control valve
70: control unit
71: drive rotation speed detector
72: driven rotation speed detector
Ca: casing
$C_{DR}$, $C_{DN}$: gear change control signal
ENG: engine
PGS: planetary gear set
Ne: engine rotation speed signal
TH: engine throttle opening degree signal
V: vehicle velocity signal
$N_{DR}$: drive pulley rotation signal
$N_{DN}$: driven pulley rotation signal

The invention claimed is:

1. An element for a metallic belt used in a belt-type continuously variable transmission, the belt-type continuously variable transmission including:
a drive pulley and a driven pulley each of which has a pulley groove defined by a fixed pulley half and a movable pulley half; and a belt including an element and wound around the pulley groove of each of the drive pulley and the driven pulley,
a constant-angle inclined generatrix portion in which a generatrix is inclined at a constant angle to widen the pulley groove radially outward being formed on a radial inner side of a region of a surface of contact, with the element, of at least the fixed pulley half out of the fixed pulley half and the movable pulley half,
a curved generatrix portion in which the generatrix is curved to gradually increase an inclination angle while widening the pulley groove radially outward being formed on a radial outer side of the region of the surface of contact,
the belt-type continuously variable transmission configured to change a gear ratio by: moving the movable pulley half of one pulley out of the drive pulley and the driven pulley away from the fixed pulley half of the pulley to increase a width of the pulley groove of the pulley; and moving the movable pulley half of the other pulley out of the drive pulley and the driven pulley closer to the fixed pulley half of the other pulley to decrease a width of the pulley groove of the other pulley,
a belt radial outer portion of a side edge of the element of the belt that contacts the drive pulley and the driven pulley is linearly shaped to follow the constant-angle inclined generatrix portion, and a belt radial inner portion of the side edge of the element is a curved shape curved to taper radially inward to gradually increase an inclination angle, and
when the element contacts the constant-angle inclined generatrix portion, the element is in line contact with the radial outer side portion which is linearly shaped, and when the element contacts the curved generatrix portion, the element is in point contact with the radial inner side portion which is curved.

2. The element for a metallic belt used in a belt-type continuously variable transmission according to claim 1, wherein the curved shape of the belt radial inner portion of the side edge of the element is smoothly curved from the inclination angle of the linearly shaped belt radial outer portion of the side edge of the element to an angle equal to or greater than a tangent angle of an outermost diameter in a contact range in which the pulley and the element contact each other, in an inward direction.

3. The element for a metallic belt used in a belt-type continuously variable transmission according to claim 2, wherein an oil drain groove extending in a plate thickness direction of the element is formed in the linearly shaped belt radial outer portion of the side edge of the element.

4. The element for a metallic belt used in a belt-type continuously variable transmission according to claim 3, wherein the oil drain groove is formed in the linearly shaped portion of the element except a boundary portion between the linearly shaped portion and the curved shape portion of the element.

5. The element for a metallic belt used in a belt-type continuously variable transmission according to claim 1, wherein an oil drain groove extending in a plate thickness direction of the element is formed in the linearly shaped belt radial outer portion of the side edge of the element.

6. The element for a metallic belt used in a belt-type continuously variable transmission according to claim 5, wherein the oil drain groove is formed in the linearly shaped portion of the element except a boundary portion between the linearly shaped portion and the curved shape portion of the element.

* * * * *